United States Patent [19]

Baylor et al.

[11] Patent Number: 5,143,436

[45] Date of Patent: Sep. 1, 1992

[54] RINGLIGHT FOR USE IN HIGH RADIATION

[75] Inventors: George A. Baylor, West Mifflin, Pa.; Howard S. Jacket, Springhill, Fla.

[73] Assignee: The United States of America as represented by the United States Department of Energy, Washington, D.C.

[21] Appl. No.: 665,112

[22] Filed: Mar. 6, 1991

[51] Int. Cl.$^5$ .............................................. F21Y 8/00
[52] U.S. Cl. ........................................ 362/32; 362/252
[58] Field of Search .................. 362/32, 33, 804, 252; 350/96.1, 96.34; 385/147

[56] References Cited

U.S. PATENT DOCUMENTS

| | | | |
|---|---|---|---|
| 3,114,283 | 12/1963 | Gruner | 362/32 |
| 3,278,739 | 10/1966 | Royka et al. | 362/32 |
| 3,786,243 | 1/1974 | Ilzig et al. | 362/32 |
| 3,971,621 | 7/1976 | Albrecht-Buehler | 362/32 |
| 4,706,168 | 11/1987 | Weisner | 362/32 |
| 4,729,070 | 3/1988 | Chiu | 362/32 |
| 4,988,162 | 1/1991 | Hayami | 350/96.34 |

*Primary Examiner*—Richard R. Cole
*Attorney, Agent, or Firm*—Judy K. Kosovich; William R. Moser; Richard E. Constant

[57] ABSTRACT

A ringlight having an annular array of light-emitting elements centered about a viewing passage has an outer annular body with an inner annular body fitted concentrically within the outer body to form an annular void and a light-enmitting aperture therebetween. A plurality of optical fibers extends into the void with end portions of the optical fibers secured therein to form an annular array at the light-emitting aperture. The first and second annular bodies cooperate to angle the end portions of the optical fibers towards a central axis of the viewing passage.

15 Claims, 2 Drawing Sheets

RINGLIGHT FOR USE IN HIGH RADIATION

The Government has rights in this invention pursuant to Contract No. DE-AC11-79PN00014 awarded by the U.S. Department of Energy.

BACKGROUND OF THE INVENTION

The present invention relates generally to ringlights for providing illumination about a central viewing area and more particularly to an improved ringlight design suitable for use in automatic gaging applications conducted in hostile radioactive environments.

A known method of measuring the effects of radioactivity on certain materials involves the scribing of a test piece of the material with fiducial marks which may, for example, comprise two very fine lines (on the order of 1/1,000 inches wide) intersecting each other at right angles. The sample piece is irradiated for a period of time and measurement and observation of the fiducial marks can indicate physical changes in the material, such as changes in size. Such measurements are, e.g., performed with apparatus known as a fiducial automated measuring machine (FAMM) and a mini-sub automated measuring machine (MAMM). Both of these apparatus operate in radioactive environments. The former operates in expended core facility (ECF) hot cells and the latter at the bottom of ECF water pits. Such apparatus are controlled remotely behind radioactive barriers via slave mechanisms. With such apparatus, it is necessary to provide proper illumination for measuring and observing the fiducial mark spacings on test mini-subs (in the ECF water pits) and on all different types of specimens measured in the ECF hot cells. Severe side lighting is necessary to emphasize the surface texture of the test piece and thus make the fiducial mark more clear for viewing and photographing. An appropriate illumination device must satisfy the following criteria: The device (1) must provide 360° uniform and sharply angled side lighting; (2) impart no heat to the specimen; (3) require little or no adjustment once it has been installed; (4) be easibly replaceable in the event some sort of failure or damage should occur; (5) be capable of utilizing a standard commercially available light source; and (6) be able to function in the hostile radioactive environments mentioned above. Heretofore, an apparatus capable of satisfying these criteria has not been available.

The prior art includes several patents disclosing the use of optical fibers to provide illumination in various applications, as described below.

U.S. Pat. No. 4,706,168 discloses a hollow cylindrical sheet of diverging light, from optical fibers, used in conjunction with two curved ring reflectors to produce a cone of illumination with an included angle which varies with object distance.

U.S. Pat. No. 4,677,473 describes a soldering inspection illuminator using optical fibers terminating on the periphery of a partial hemisphere. Emitting means can be sequentially activated.

U.S. Pat. No. 3,278,739 describes illumination, e.g., for a microscopy object, provided by multiple optical fiber strands directed obliquely at the object from their ends arranged in a circle. The number of strands is limited only by microscope and object requirements.

U.S. Pat. No. 4,639,837 discloses an optical system for high magnification endoscopes including an annularly arranged light guide fiber bundle on a tapering support frame.

U.S. Pat. No. 4,729,079 describes an illuminator for automated machine vision providing high contrast illumination from a spherical reflector with an inner diffusing coating, and fiber optic bundles supplying light.

U.S. Pat. No. 3,971,621 describes relief-like contrast generated at microscopic images of a transparent phase object by one-sided oblique illumination from an optical fiber bundle.

U.S. Pat. No. 4,729,070 discloses an adjustable ringlight with discrete, peripherally arrayed optical fibers, which may be angled. The angle may be changed by cam action.

None of the apparatus described in the above-mentioned patents satisfactorily meets all of the criteria mentioned above for providing illumination for the viewing and measurement of fiducial marks in hostile radioactive environments.

SUMMARY OF THE INVENTION

It is an object of the present invention to provide a ringlight which satisfactorily fulfills each of criteria (1) through (6) mentioned above for use in hostile radioactive environments.

It is a further object of the present invention to provide a ringlight which is relatively simple in construction and with few parts, and which is thus very reliable in operation.

The above and other objects are achieved in the present invention by a ringlight providing an annular array of light-emitting elements centered about a viewing passage, wherein the improvement comprises: a first annular body, a second annular body mounted concentrically within the first annular body so as to form an annular void and light-emitting aperture therebetween, and a plurality of optical fibers extending into the void with end portions thereof secured therein so as to form an annular array of optical fiber end surfaces at said light-emitting aperture, the first and second bodies cooperating to angle the end portions of the plurality of optical fibers toward a central axis of the viewing passage.

DETAILED DESCRIPTION OF THE PREFERRED EMBODIMENTS

Figure 1:
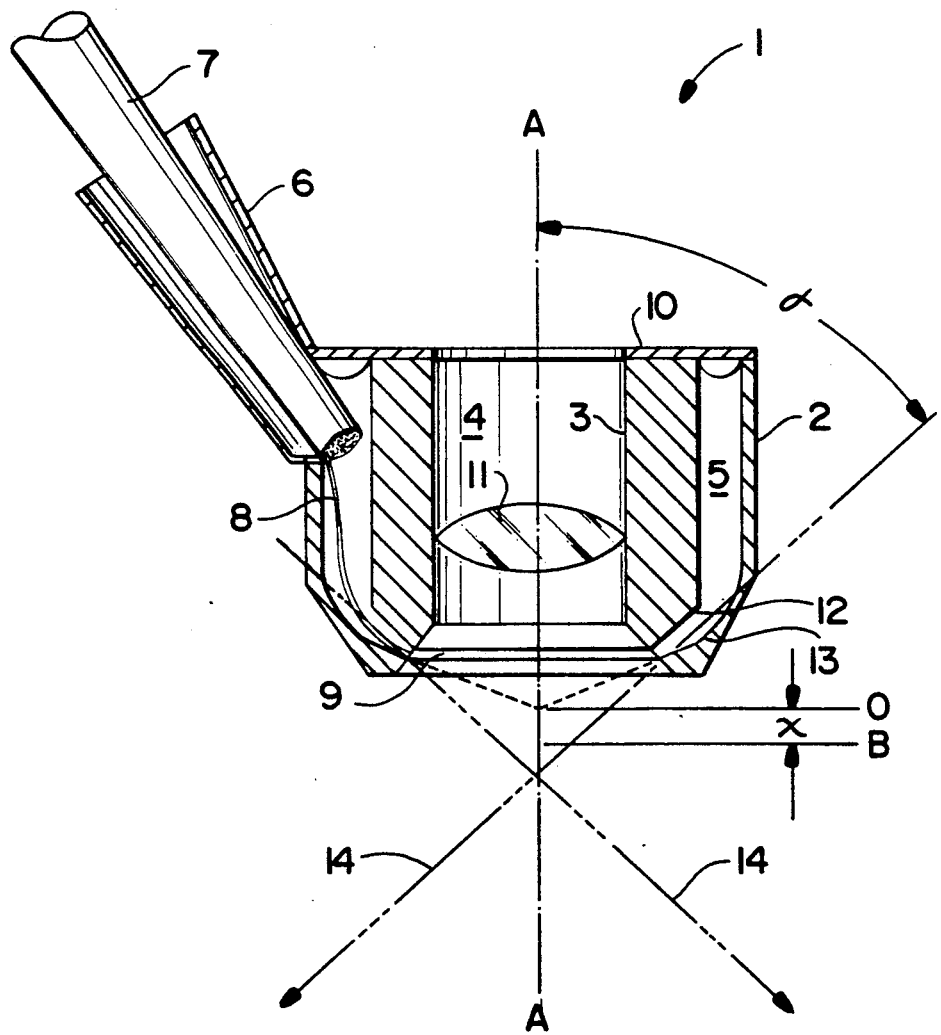
FIG. 1 is a cross-sectional view of the ringlight.
Figure 2A:
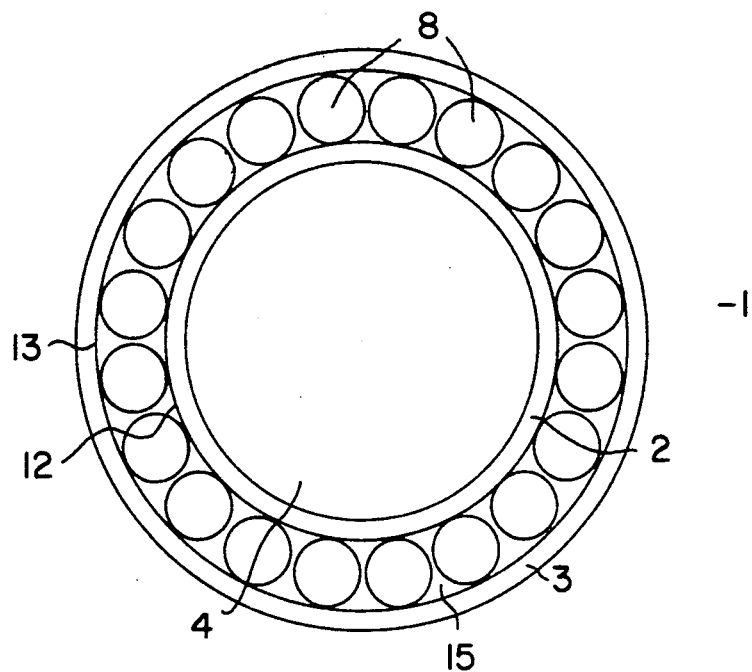
FIGS. 2a and 2b are end views of the optical fibers secured in the annular void.
Figure 2B:
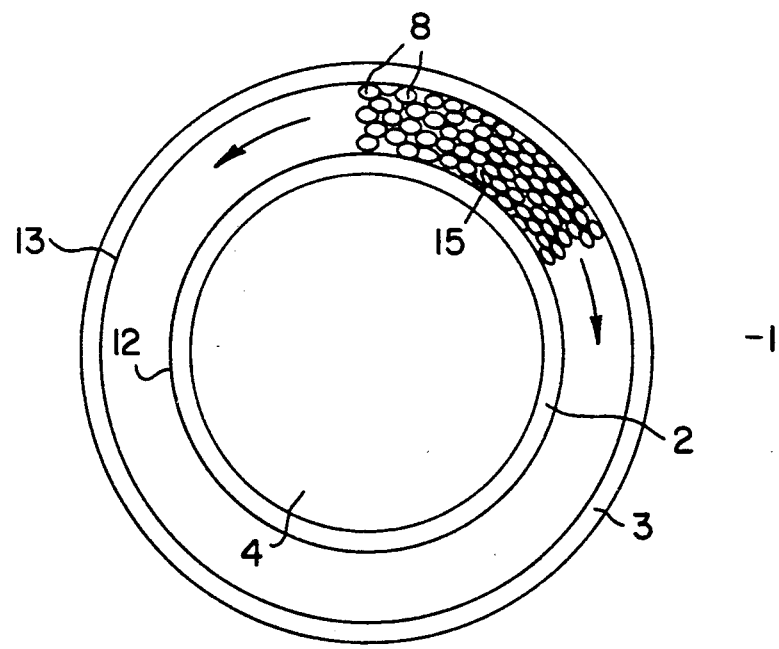

With reference to the FIG. 1, depicted in cross-section is a ringlight 1 according to the present invention comprising an outer annular body 2 and an inner annular body 3, each of which is circular in horizontal cross-section. Inner body 3 is of a smaller diameter than outer body 2 and is fitted concentrically within body 2. A cylindrical viewing passage 4 extends through inner body 3 mounted within body 2. An annular void 5 is formed between outer body 2 and inner body 3. A sleeve 6 extends through body 2 into annular void 5 providing a passage and secure coupling for an optical fiber bundle 7 extending from a conventional light source (not shown) through sleeve 6 and into annular void 5. Optical fibers from the bundle 7 are separated into individual fibers 8 (only one shown for purposes of illustration) which extend to annular light-emitting aperture 9. In a preferred embodiment, a sufficient number of fibers 8 are provided such that lower end portions of the fibers may be positioned in side-by-side contact with one another about the entire circular extent of the annular light-emitting aperture 9 as shown in FIGS. 2a and 2b.

An annular cover 10 is secured to inner body 2 and outer body 3. The inner void of annular cap 10 corresponds in shape and size to that of inner body 3, thus maintaining the viewing passage 4 unobstructed. Reference 11 depicts diagrammatically a lense of an optical recording or transmitting apparatus, e.g. a camera, fitted at or above viewing passage 4, as described in further detail below.

Lower portions of the outer body 2 and inner body 3 are configured so as to bend the optical fibers 8 by an angle relative to central axis A—A of the viewing passage 4. Specifically, a lower outer surface 12 of inner body 3 tapers inwardly toward the central axis A—A. Similarly, an inner lower surface 13 of outer body 2 tapers toward the central axis A—A. In a preferred embodiment, the tapering angle of surface 13 is more extreme than that of surface 12. As a result, a lower portion of void 5 tapers gradually towards light-emitting aperture 9. Thus, surfaces 12 and 13 cooperate to secure and orient lower end portions of fibers 8 at an acute angle c relative to central axis A—A.

Preferably, the structural parts of ringlight 1 are constructed of machined aluminum or stainless steel. Stainless steel is most preferable for its corrosion resistant properties, and is necessary for the applications in ECF water pits described above. Bodies 2 and 3 may be machined from solid blocks of material, as by turning on a lathe. The end surfaces of the inner and outer bodies directly adjacent annular light-emitting aperture 9 comprise contiguous linear surfaces of rotation converging upon central axis A—A. These surfaces may be accurately finished by known methods such as lapping. Sleeve 6 may be secured within a hole machined in outer body 2, by known means such as brazing. After optical fibers 8 have been accurately positioned about void 5 with end surfaces at light-emitting aperture 9, the assembly of bodies 2 and 3 and fibers 8 can be secured by suitable adhesive such as epoxy. Then, cover 10 may also be secured to bodies 2 and 3 by adhesive 15.

In a preferred embodiment, optical fibers 8 are hydroxyl ion doped fused silica (super pure quartz) optical fibers. Such fibers are able to absorb reasonable amounts of gamma radiation before the effects of browning out limit their usefulness. These fibers can absorb about $3 \times 10^8$R whereas glass or "normal" quartz fibers brown out after having absorbed about $10^6$ to $10^7$R.

Thus, hydroxyl ion doped fused silica fibers are particularly suitable for applications in radioactive environments. However, fused silica fibers have a very narrow numerical aperture. That is, the divergence angle of light emitted from the end of such a fiber is much less than that of conventional glass fibers. This creates a problem if such fibers are arranged in a circular array and are directed parallel to central axis A—A, in that a large shadowed area is created in the center of the array extending a significant distance from the light-emitting aperture. In this case, to illuminate a surface area in line with viewing passage 4, it is necessary to move the ring light a considerable distance from the surface. By doing so, however, a sharp contrasty image between, e.g., a fudicial mark on the surface and the background is lost.

The angling of optic fibers 8 in the present invention eliminates the above-cited problem with shadowing since by altering the orientation of the fibers on the interior of the ringlight, and thus their end surfaces, the beam of light emitted from aperture 9 creates a conical pattern. As depicted by arrows 14, two peak-to-peak cones result. The converging angle of the inverted top cone corresponds to the angle $\alpha$ of the optical fibers 8 with respect to central axis A—A. The inventors have found that to provide a sharp contrasy image on the surface of a specimen to be viewed through viewing passage 4, with radiation-resistant hydroxyl ion doped fused silica optical fibers, $\alpha$ should be between 40° and 80°. Most preferably, $\alpha$ is between 55° and 60°. As shown in FIG. 1, a cone shaped region above plane O is shadowed, and hence will provide no light to the specimen. Rather, locating the surface of the specimen in plane B between plane O and the peak of the inverted cone of light results in sharp contrasty side lighting. The larger the angle $\alpha$ and the shorter the distance x (i.e., the closer the specimen is to plane O), the more severe the side lighting. As $\alpha$ is decreased and the distance x is increased, the relative amount of front lighting increases and the image appears the same as is obtained with commercial beam splitter illumination arrangements. Thus, the ringlight of the present invention has the potential for providing proper illumination for viewing situations which require anything from extreme contrasty side lighting to flat front lighting.

In applications in radioactive environments, the ringlight may be firmly fastened to the front of a radiation hard microscope camera mounted in, e.g., a fiducial automated measuring machine (FAMM). The ringlight can be secured to the camera with, e.g., two set screws and requires no adjustment once it is installed. A fiber optic coupling may be provided on the camera head so that the camera can be removed without the ringlight. A fiber optic extension cable may extend from the coupling to a special ECF cell plug and through the cell plug to the hot cell gallery. At this point, the cable may be connected to a standard commercial light source. This arrangement permits simplified adjustment of the light intensity, and easy maintenance of the light source itself.

The present invention has been described in terms of preferred embodiments thereof. Various modifications and other embodiments within the scope and spirit of the invention will occur to those skilled in the art upon a review of this disclosure. Thus, the present invention is limited solely by the scope of the appended claims.

What is claimed is:

1. A ringlight for use in a high radiation environment providing an annular array of light-emitting elements centered about a viewing passage, the improvement comprising:
a first annular body, a second annular body, each annular body having an inner and an outer surface, said second annular body mounted concentrically within said first annular body so as to form a single annular light-emitting aperture and an annular void between the inner surface of said first annular body and the outer surface of said second annular body, and a plurality of optical fibers extending into said void and having end portions thereof secured therein so as to form an annular array of optic fiber end surfaces at said light-emitting aperture, said first and second bodies cooperating to angle the end portions of said plurality of optical fibers toward a central axis of said viewing passage.

2. A ringlight according to claim 1, wherein said first and second bodies consist, respectively, of machined one-piece metal bodies.

3. A ringlight according to claim 1, wherein said annular bodies are made of aluminum and stainless steel.

4. A ringlight according to claim 1, wherein the end portions of said plurality of optic fibers are arranged in side-by-side contact with one another about an entire circular extent of the annular aperture.

5. A ringlight according to claim 4, wherein the end portions of said plurality of optical fibers are secured to each other and the first and second bodies by adhesive means.

6. A ringlight as in claim 5, wherein said adhesive means is epoxy.

7. A ringlight according to claim 1, wherein said plurality of optical fibers comprise hydroxyl-ion doped fused silica optical fibers.

8. A ringlight according to claim 7, wherein the end portions of said optical fibers are angled toward the center axis by an angle $\alpha$, wherein $40° \leq \alpha \leq 80°$.

9. A ringlight according to claim 8, wherein $55° \leq \alpha \leq 60°$.

10. A ringlight according to claim 1, wherein said inner surface of the first annular body converges towards said central axis at a greater angle than does said outer surface of the second annular body, such that said annular void tapers toward said light-emitting aperture.

11. A ringlight according to claim 1, wherein end surfaces of said first and second bodies directly adjacent to said annular aperture are frustoconical surfaces having same virtual apex on the central axis.

12. A ringlight according to claim 1, further comprising an annular cover member secured to end portions of said first and second bodies opposite said light-emitting aperture.

13. A ringlight according to claim 12, further comprising an optical fiber bundle guide sleeve attached to said first body.

14. A ringlight as in claim 1, wherein said second annular body has a viewing passage formed through its center.

15. A ringlight as in claim 14, wherein said viewing passage is suitable for passing an image to an optical recording means.

* * * * *